United States Patent [19]

Hatfield et al.

[11] 3,766,325

[45] Oct. 16, 1973

[54] CONTROL CIRCUITS FOR KEY TELEPHONE SYSTEM

[75] Inventors: William C. Hatfield; John M. Reed, both of Dallas, Tex.

[73] Assignee: Lordel Manufacturing Company, Monrovia, Calif.

[22] Filed: Sept. 13, 1971

[21] Appl. No.: 179,839

Related U.S. Application Data

[63] Continuation-in-part of Ser. No. 158,790, July 1, 1971, abandoned.

[52] U.S. Cl. .................................. 179/84 A, 179/99

[51] Int. Cl. .............................................. H04m 3/02

[58] Field of Search .............. 179/81 R, 81 C, 84 R, 179/84 A, 84 L, 99; 321/47

[56] References Cited

UNITED STATES PATENTS

| | | | |
|---|---|---|---|
| 3,683,122 | 8/1972 | Kalju | 179/84 R |
| 3,515,813 | 6/1970 | Cleary | 179/84 A |
| 3,247,327 | 4/1966 | Lanham | 179/84 A |
| 3,436,488 | 4/1969 | Barbato | 179/84 R |
| 3,649,772 | 3/1972 | Fitzsimons | 179/99 |
| 3,603,865 | 9/1971 | Liebenthal | 321/47 |
| 3,420,963 | 1/1969 | Abbott | 179/84 R |
| 3,412,213 | 11/1968 | McCay | 179/81 C |
| 3,320,368 | 5/1967 | Applebaum | 179/84 C |
| 3,406,262 | 10/1968 | Grandstaff | 179/84 R |

OTHER PUBLICATIONS

Howell, "Light Activated Switch," ELECTRONICS, May 4, 1964, at 53–55.

*Primary Examiner*—Thomas W. Brown
*Attorney*—Giles C. Clegg, Jr. et al.

[57] ABSTRACT

Completely solid-state circuitry is disclosed for controlling the operation of a key telephone system. The circuitry includes a ringing current detection circuit which comprises an array of transistors responsive to ringing current for applying control signals to a plurality of current supply control circuits. The circuitry also includes an in-use circuit and a holding circuit responsive respectively to an off-hook indication and a holding signal for applying control signals to other current supply control circuits. The current supply control circuits, each of which includes a transistor and full-wave diode bridge rectifier, control the application of current from various current supplies to various loads such as the key telephone set ringer, line lamp, etc. The holding circuit includes optically coupled isolators for isolating the line voltage from the detection and current supply circuits.

15 Claims, 5 Drawing Figures

CONTROL CIRCUITS FOR KEY TELEPHONE SYSTEM

CROSS REFERENCES TO RELATED APPLICATIONS

This application is a continuation-in-part of copending U.S. patent application, Ser. No. 158,790, filed July 1, 1971, now abandoned.

BACKGROUND OF THE INVENTION

Key telephone sets provide for the termination of a plurality of telephone lines in one telephone set and allow calls to be made to or from the set over any of those lines. In addition, any line terminating in the set for which a talking path has been established can be placed on "hold" (the line is temporarily disconnected from the set) and another talking path established on a second line terminating in the set. The second line can, in turn, be placed on "hold" while still a third line is utilized, etc. Then, if "reconnection" is desired to one of the lines placed on "hold", a button on the key telephone set corresponding to that line is depressed thereby "reconnecting" the line to the set. The conversation over that line can then be resumed.

In order to notify the user of the telephone set of the status of the various lines terminating in the set, various auditory and visual signals are provided. One such signal, common to both the standard telephone set and the key telephone set, is the ringing or buzzing signal which notifies the user that there is an incoming call on one of the lines. On the key telephone set, there is also a light signal (normally a flashing light signal) emitted from a lamp corresponding to the line over which the incoming call is being made. This signal notifies the user of the line to which he should connect to receive the incoming call. The user would then depress a button on the set corresponding to this line thereby "connecting" the line to the set and the call would be ready to be received.

After the key telephone handset is removed from the hook, another visual signal is provided by a lamp corresponding to the line to which the key telephone set is presently connected. This signal is normally a steady light signal and indicates that the particular line in question is in use. This is important if a number of lines are each connected to a number of different key telephone sets so that the user of one such set will be notified when one of the lines is being used by the user of another of such sets.

The final signal provided by the key telephone set is that indicating that a particular line is on "hold". This signal is also a visual signal consisting normally of a winking light signal from the lamp corresponding to the line which is on "hold". (A winking light signal is less intermittent than a flashing light signal.)

Key telephone systems consist primarily of three main parts—(1) the key telephone set which includes the receiver and transmitter, dialing circuitry, and line lamps, (2) the key telephone system power supply for providing ringing or buzzer current, line lamp current, etc., and (3) the control circuit for controlling the functions and operations of the key telephone system. Prior art key telephone system control circuits typically include mechanical relays in combination with other circuitry. Such relays have heretofore been considered necessary to provide isolation among the various voltage levels in the control circuit and to control the application of signals to various portions of the circuit, where such signals may be either AC or DC and where the DC signals may be either of positive or negative polarity.

There are numerous drawbacks of relay dependent circuits, all of which may be attributed to the inherent characteristics of relays. These drawbacks include pitting and deterioration of the relay contacts (caused by sparking and arcing) which reduce the life of the circuit, the relative bulkiness of relays (when compared, for example, to solid state circuitry), the relatively large current supply required to operate relays, and the relatively slow operation time of relays.

SUMMARY OF THE INVENTION

It is an object of the present invention to provide a simple and compact key telephone system control circuit.

It is another object of the present invention to provide a key telephone system control circuit which does not require the use of mechanical relays.

It is still another object of the present invention to provide a highly reliable key telephone system control circuit.

It is still another object of the present invention to provide a key telephone system control circuit which requires a relatively small amount of power to operate the circuit.

These and other objects of the present invention are realized in one illustrative key telephone system control circuit which utilizes solid state circuitry for providing all control and isolation functions. The circuit includes a ringing current detection circuit connected to the tip and ring of a telephone line, a holding circuit, also connected to the tip and ring and to a "hold" and "line select" input lead, an in-use circuit, and a plurality of current supply control circuits connected variously to the detection, holding, and in-use circuits and to the ringer interrupter motor, and current supplies and key telephone set line lamp corresponding to the telephone line. Ringing current on the telephone line is applied via a full-wave diode bridge rectifier to a capacitor in the detection circuit thereby charging the capacitor. The charge on the capacitor enables a series of detection circuit transistors to apply appropriate control signals to three of said current supply control circuits—one of which responds by applying current from a current supply to the interrupter motor, another of which responds by applying ringing current from a current supply to the ringer, and the third of which responds by applying lamp-flash current to the line lamp. In one embodiment of the invention current supply control circuits each comprise a transistor, the base of which is connected to the detection circuit, and the emitter and collector of which are connected to a full-wave diode bridge rectifier, which is connected to a current supply and load (lamp, ringer, etc.). When the telephone set receiver is taken off hook, the in-use circuit responds by signaling a fourth current supply control circuit to apply steady-lamp current to the line lamp and by disabling the ringing current detection circuit. Finally, when the hold button is operated, the holding circuit, which comprises optically coupled isolators and transistors, responds by providing holding current path and by signaling a fifth current supply control circuit to apply lamp-wink current to the line lamp. The isolators in the holding circuit are utilized to provide, among other things, isolation of the line voltage from the detection and current supply control circuits.

A capacitor may be included in the holding circuit for maintaining the key telephone system control circuit in the "hold" condition even though line reversals or momentary line current interruptions occur.

BRIEF DESCRIPTION OF THE DRAWINGS

A complete understanding of the present invention and of the above and other advantages thereof may be gained from a consideration of the following detailed description of an illustrative embodiment thereof presented in connection with the accompanying drawings in which.

DETAILED DESCRIPTION

Figure 1A:
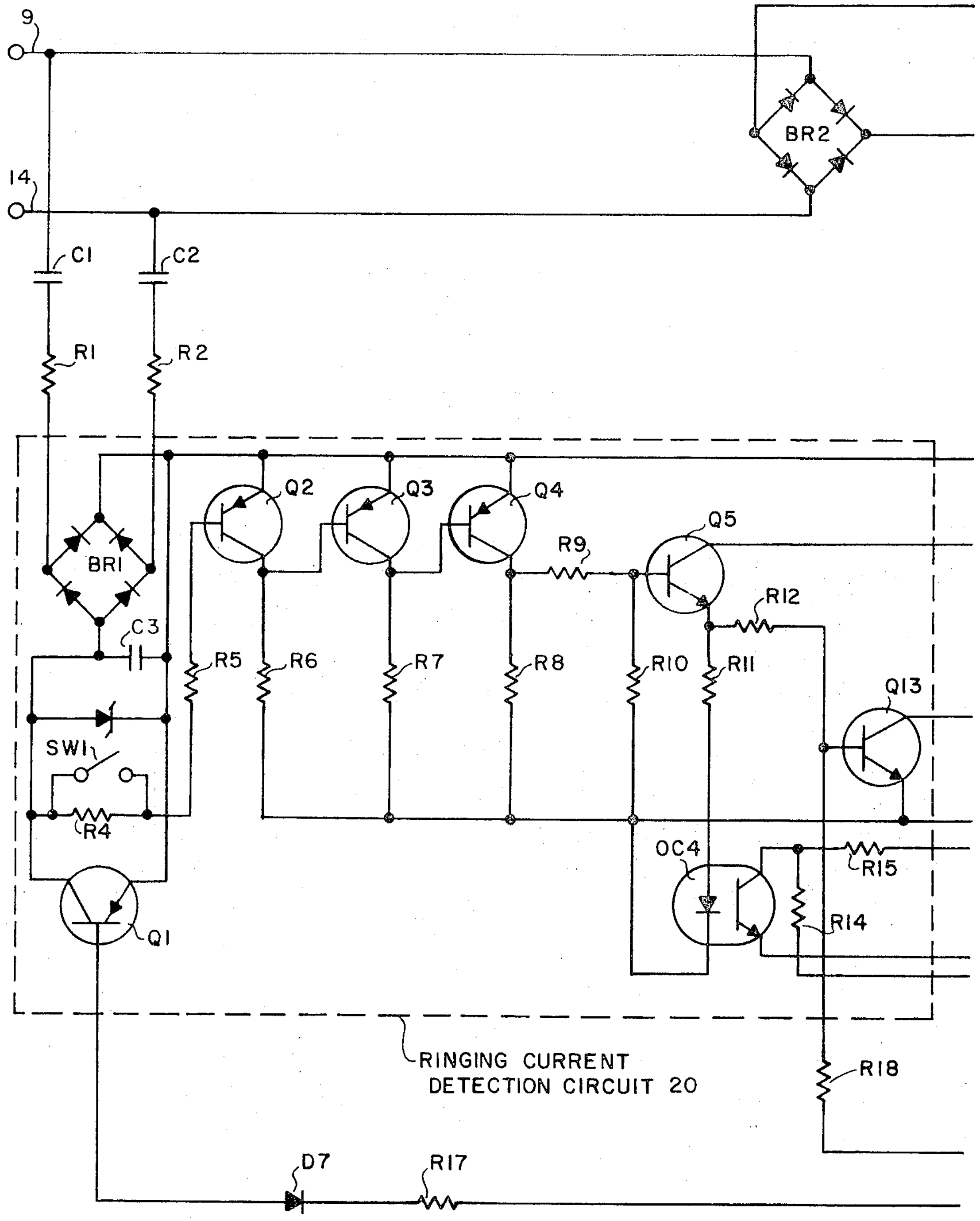
FIGS. 1A and 1B, with FIG. 1A positioned to the left of FIG. 1B, show one illustrative circuit configuration made in accordance with the principles of the present invention.
Figure 1B:
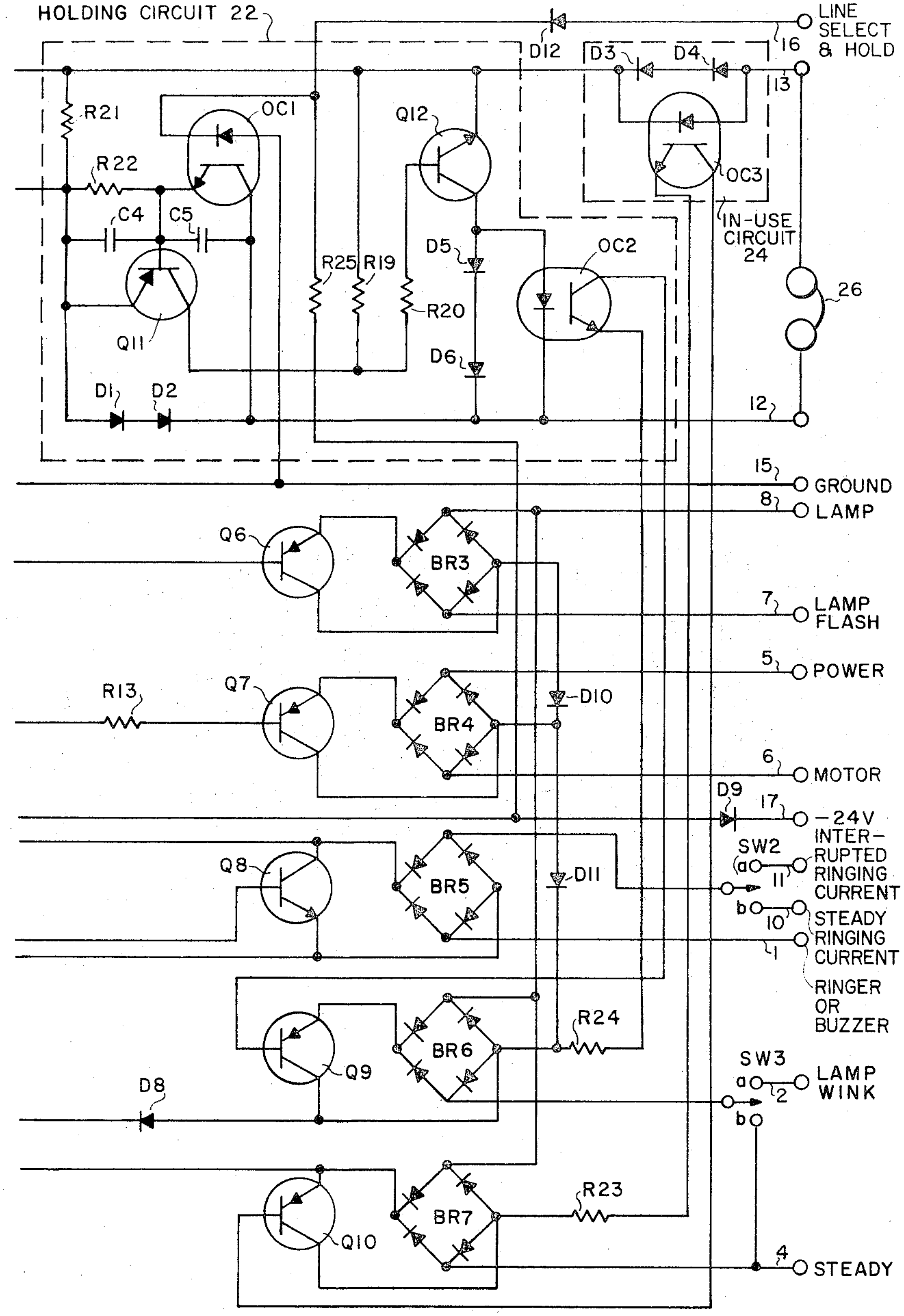

The circuit of composite FIG. 1 is designed for use with one of the line pairs terminating in a standard key telephone set. The circuit includes a pair of wires 9 and 14, known as the tip and ring of a telephone line, over which ringing signals are received by the circuit and voice signals are transmitted to and from a key telephone set receiver 26 (FIG. 1B). The wires 9 and 14 are connected to the key telephone set receiver 26 via a full-wave diode bridge rectifier BR2 and diodes D1, D2, D3 and D4. The bridge BR2 enables the transfer of DC current of the proper polarity to a "holding" circuit 22 and an "in-use" circuit 24 of FIG. 1B regardless of the polarity of the signals received over lines 9 and 14. This is necessary for the proper operation of the circuits 22 and 24 as will be apparent later. (The bridge BR2 also insures proper operation of the telephone set to which the circuit of composite FIG. 1 is connected regardless of the line conditions on wires 9 and 14.) Thus, a DC signal of negative polarity received over either line 9 or 14 will be applied by the bridge BR2 to line 13. On the other hand, a DC signal of positive polarity received over either line 9 or 14 will be applied by the bridge BR2 to line 12.

When a call is made to the key telephone set for which the circuit of FIG. 1 provides control, AC ringing current is applied via wires 9 and 14, capacitor C1 and C2, and resistors R1 and R2 to a ringing current detection circuit 20. The capacitors C1 and C2 are provided to prevent application of DC current to the detection circuit 20 from wires 9 and 14. Appropriately rated threshold breakover devices such as solid state bilateral diode switches or bilateral gas-discharge tubes such as the well known NE 2 neon bulbs could be provided in place of the capacitors C1 and C2 to inhibit conduction of current from the wires 9 and 14 to the ringing current detection circuit 20 until ringing current of sufficient voltage caused the diode switches or tubes to conduct. The ringing current is rectified by a full-wave diode bridge rectifier BR1 and applied across a capacitor C3. The capacitor C3 is charged by the ringing current with the left-hand plate storing a negative charge. A PNP type transistor Q1 is normally in the "off" or non-conducting condition so that the capacitor C3 discharges via either resistors R4 and R5 or resistor R5 alone (depending on which position a switch SW1 is in) through a transistor, Q2. Resistors R4 and R5 and switch SW1 are employed to provide different discharge times for the capacitor C3. The specific discharge time desired is chosen simply by shorting or not shorting resistor R4 with switch SW1.

Charging the capacitor C3 causes the PNP type transistor Q2, which is normally in the "off" condition, to be turned on or placed in a conducting condition. A PNP type transistor Q3, which is normally in the "on" condition, is turned off when the voltage at its base thereof is changed from a negative value to nearly ground level by turning "on" transistor Q2. Upon transistor Q3 being turned off, a PNP type transistor Q4, which is normally in the "off" condition, is turned on. This, in turn, results in an NPN type transistor Q5, which is normally in the "off" condition, being turned on or placed in a conducting condition. Transistors Q4 and Q5 are provided to amplify the signal which drives transistors Q6 and Q13 and an optically-coupled isolator OC4. Turning on Q5 biases the light-emitting diode of the optically-coupled isolator OC4 to conduct current from a negative current supply 17 through the diode, through a resistor R11, and through the transistor Q5 to the base of a PNP type transistor Q6. (The isolator OC4, and all optically-coupled isolators hereinafter discussed, may be of the type described, for example, in Texas Instruments Bulletin No. CB 116 entitled "Optically Coupled Isolators".) The isolator OC4 is provided to isolate any power on leads 10, 11 or 1 from the rest of the circuitry. With current flowing through the diode of the isolator OC4, the isolator is placed in a conducting condition so that current of positive polarity flows from lead 10 or 11 (which are connected to power supplies as will be discussed later), depending on the setting of a switch SW2, through a full-wave diode bridge rectifier BR5 and through the isolator OC4 to the base of an NPN transistor Q8, thereby turning on the transistor Q8.

With transistor Q8 placed in a conducting condition, any signal, whether AC or DC (of either positive or negative polarity) applied through the switch SW2 to the bridge rectifier BR5 will be applied to an output lead 1. Specifically, any signal received via switch SW2 will be applied via one leg of the bridge BR5, through the transistor Q8, via the opposite leg of the bridge BR5 to the output lead 1. The circuit comprising the combination of the transistor Q8 and the bridge BR5 is described more fully in a co-pending application of William C. Hatfield and John M. Reed, Ser. No. 147,505 filed May 27, 1971, now abandoned.

When the switch SW2 is in position *b*, the transistor Q8 and bridge BR5 serve to apply to lead 1 current received from a current supply over a lead 10 to thereby operate the ringer or buzzer of the key telephone set to which the circuit of composite FIG. 1 is connected. When the switch SW2 is in position *a*, the transistor and bridge serve to apply to lead 1 an intermittent current received from an interrupter (to be discussed later) over a lead 11 to thereby operate the telephone set ringer or buzzer. The switch SW2 simply provides the option of having ringing current received over the line pair 9 and 14 actuate either a ringer or a buzzer in the manner described above.

As indicated earlier, turning on transistor Q5 causes current of negative polarity to be applied to the base of transistor Q6 turning on the transistor Q6. Turning on transistor Q5 also causes the voltage at the base of a transistor Q13 to be less negative thereby placing the transistor Q13 in a conducting condition. With the transistor Q13 in a conducting condition, current of negative polarity is applied from lead 17, via the transistor Q13 to the base of a PNP type transistor Q7, thereby turning on the transistor Q7. With the transistors Q6 and Q7 turned on, conductive paths are provided between leads 7 and 8 and between leads 5 and 6. Thus, any signals received over leads 7 and 5 would be applied to leads 8 and 6 respectively. Lead 5 connects to a power source and lead 6 to a motor. When transistor Q7 is turned on, the power source supplies power to the motor, turning it on. The motor, in turn, operates an interrupter which is used to provide various, intermittent signals for operating the key telephone set lamps and ringer or buzzer. One such intermittent signal is applied to lead 7 and then, when transistor Q6 is on, via a full-wave diode bridge rectifier BR3, the transistor Q6, and lead 8 to a lamp on the key telephone set. This lamp is associated with the line pair 9 and 14 so that when ringing current is received over the pair, the lamp generates a flashing light signal to notify the telephone set user that an incoming call is present on the line in question.

Thus, when ringing current is received over the line pair 9 and 14, the current is detected by the detection circuit 20 which causes transistors Q6, Q7 and Q8 to turn on. When transistor Q7 is turned on, an interrupter is operated to supply different intermittent signals to leads 2, 7, 10 and 11. With transistors Q6 and Q8 turned on, appropriate intermittent signals are applied from lead 7 to lead 8 to operate a lamp and from either lead 10 or 11 to lead 1 to operate a ringer or buzzer.

When the telephone receiver 26 is taken off hook, in response to an incoming call, a DC path is closed across leads 12 and 13 thorugh the receiver 26 of FIG. 1B, and ground potential is applied to lead 16. The telephone switching office which is supplying the ringing current over the line pair 9 and 14 detects the DC path closure and removes the ringing current. If the capacitor C3 is still charged, it is desirable that it be immediately discharged so that the key telephone set ringer or buzzer will not be operated while the call is underway. Discharging the capacitor C3 is initiated by the in-use circuit 24 as follows.

When the DC path connecting leads 12 and 13 is closed through the receiver 26, telephone office battery current flows through the "loop" and thus through diodes, D3 and D4 creating a voltage drop thereacross. This voltage drop forward biases the light-emitting diode of an optically coupled isolator OC3. Current thus flows through the diode of isolator OC3 placing the isolator in a conducting condition. This causes a negative voltage to be applied from bridge BR7 through the isolator OC3 to the base of a transistor Q10, and then via the emitter of the transistor Q10, through a resistor R17 and diode D7 to the base of transistor Q1. This negative voltage turns the transistor Q1 on thereby providing a conductive path from the left-hand plate of the capacitor C3 through the transistor Q1 to ground via lead 15. This discharges the capacitor C3 thus preventing any further ringing or buzzing of the key telephone set.

The in-use circuit 24 also causes the application of a "steady" lamp signal to the lamp associated with the line pair 9 and 14. This is accomplished as follows. The negative voltage applied to the base of the transistor Q10 turns the transistor on thereby providing a conductive path between lead 4 and lead 8. A steady (i.e. uninterrupted) AC signal is supplied over lead 4 and applied via the bridge BR7 and the transistor Q10 to lead 8 and thus to the lamp associated with the line pair 9 and 14. This steady signal causes the NPN lamp to generate a steady light signal indicating an off-hook condition for the line in question, i.e. that the incoming call on the line has been answered.

The remaining control functions performed by the circuit of composite FIG. 1 apply to the hold operation of the key telephone set. When the "hold" button on the set is depressed, ground potential is removed from lead 16 of FIG. 1B. This biases the light-emitting diode of an optically coupled isolator OC1, so that the diode conducts current from lead 17 through a current limiting resistor R25 to lead 15 and thereby places the isolator OC1 in a conducting condition. A positive voltage is then applied via diodes D1 and D2, through the isolator OC1, to the base of a PNP type transistor Q11. The voltage drop across diodes D1 and D2 creates an emitter-to-base voltage drop in transistor Q11, thereby turning on the transistor. Turning on transistor Q11 results in the application of a positive voltage to the base of an PNP type transistor Q12. This places the transistor Q12 in a conducting condition thus closing a DC path between leads 12 and 13 via the transistor Q12 and diodes D5 and D6 and the diode of an optically coupled isolator OC2. This path provides the "Closed loop" necessary for the telephone switching office to maintain the connection with the line pair 9 and 14. Now, even though the telephone receiver 26 is placed on hook or the key telephone set is switched to another of its terminating lines (either of which "open" the DC path from lead 12 through the telephone set to lead 13), the telephone switching office connection with the line pair 9 and 14 will be maintained. Capacitors C4 and C5, each interconnecting the base of the transistor Q11 to a different portion of the lead 12 are provided to maintain the transistor Q11 and thus the transistor Q12 in the "on" condition during line reversals or temporary line current interruptions. This is so the "hold" condition of the holding circuit 22 will be maintained. Of course, if it is desired that the "hold" condition not be maintained upon the interruption of line current, or upon an interruption lasting a certain time interval, the capacitors C4 and C5 could be chosen accordingly.

When, following operation of the "hold" button, either the telephone receiver 8 is placed on hook or the key telephone set is switched to another line, the isolator OC3 is turned off since current no longer flows through the diode of the isolator. Turning off the isolator OC3 causes the transistor Q10 to turn off thereby extinguishing the steady lamp signal generated by applying current from lead 4 to lead 8.

When the transistor Q12 is turned on following operation of the "hold" button, switching office battery current flows through the transistor and through the diode of the isolator OC2 thereby placing the isolator in a conducting condition. This causes a negative voltage to be applied from either lead 2 or 4 (depending on the setting of a switch SW3), via a full-wave diode bridge rectifier BR6, through the isolator OC2, to the base of a PNP type transistor Q9. This negative voltage turns on the transistor Q9 thereby providing a conductive path from either lead 2 or 4 to lead 8. As indicated earlier, a steady signal is applied to lead 4, while an interrupted or intermittent signal is applied to lead 2 (a "winking" signal from the interrupter). Depending on which setting of the switch SW3 is chosen, a signal from either lead 2 or 4 is applied to the key telephone set lamp associated with the line pair 9 and 14 thereby indicating that the line has been placed on "hold". (Normally, the winking light signal is used to indicate a "hold" condition.)

With the isolator OC2 in the conducting condition and thus the transistor Q9 turned on, a positive voltage is applied from lead 2 or 4, through the bridge BR6, the transistor Q9, a diode D8 and resistor R18 to the base of the transistor Q13. This maintains the transistor Q13 in the "on" condition and thus also the transistor Q7 in the "on" condition, thereby maintaining the motor on. The motor, of course, operates the interrupter which provides the winking light signal (assuming that the winking-signal option is chosen).

The "hold" condition for the line pair 9 and 14 is removed by depressing the line button corresponding to the line pair 9 and 14. This actuates a switch in the key telephone set placing lead 16 again at ground potential (assuming the receiver is off hook). The isolators OC1 and OC2 assume non-conducting conditions and, if the telephone receiver 26 is off-hook, the circuit assumes the same condition which existed just prior to going on "hold". If the receiver 26 is on-hook, then the telephone switching office connection to the line pair 9 and 14 is removed by the switching office.

The various resistors shown in the circuit of composite FIG. 1, but not specifically discussed, are for limiting current or for biasing other elements of the circuit, the specific functions performed being apparent from the positions of the resistors in the circuit. The diodes of the circuit are for providing fixed voltage drops or for preventing current of improper polarity from being applied to various elements of the circuit, the specific function performed again being apparent. It should also be noted that various transistors or groups of transistors could be replaced by integrated circuit chips without deparing from the scope of the invention.

As described above, control of all key telephone set functions is provided by the circuit of FIG. 1 in simple, economical and yet reliable manner and without using mechanical relays. Solid state circuitry is used for isolating, detecting, and controlling the flow of signals whether AC or DC and whether of positive or negative polarity.

Figure 2A:
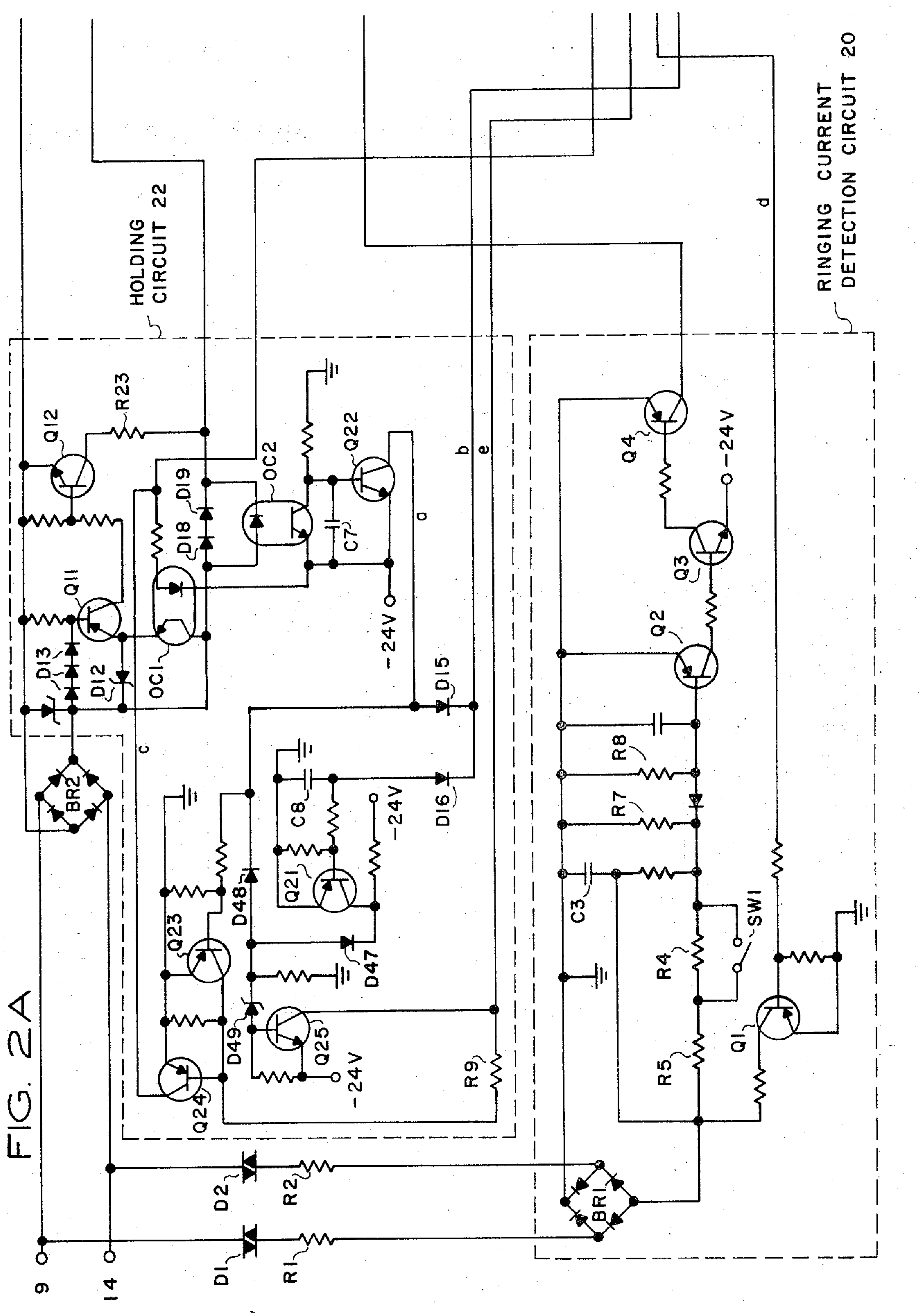
FIGS. 2A and 2B, with FIG. 2A positioned to the left of FIG. 2B, show an alternative circuit configuration made in accordance with the principles of the present invention.

Composite FIG. 2 shows an alternative embodiment of a key telephone system control circuit made in accordance with the principles of the present invention. The functions performed by the circuit of FIG. 2 are essentially the same as those described for the circuit of FIG. 1 and thus will not be described in the same detail as were those of FIG. 1. Circuit elements in FIG. 2 which are the equivalents of certain elements in FIG. 1 bear the same designations as in FIG. 1. A brief description of the operation of the FIG. 2 circuitry will now be given.

Any ringing current on wires 9 and 14 is applied via bilateral diode switches D1 and D2, resistors R1 and R2, and a full-wave diode bridge rectifier BR1 to charge a capacitor C3 and to turn on a PNP type transistor Q2. The bilateral diode switches D1 and D2 prevent current from flowing from wires 9 and 14 to charge the capacitor C3 unless the breakover voltage of the switches D1 and D2 is exceeded by the voltage on lines 9 and 14. The diode switches D1 and D2 thus prevent noise or other spurious signals on the telephone line (wires 9 and 14) from charging the capacitor C3 and causing a false ringing condition. When capacitors are used in place of the diode switches D1 and D2 such as in FIG. 1A, a false ringing condition is more likely to occur because of noise. Of course, if the voltage level of the noise or spurious signals exceeds the breakover voltage of the diode switches D1 and D2, then a false ringing condition would result. As indicated earlier, gas-discharge tubes could also be used in place of the diode switches D1 and D2.

Turning on the transistor Q2 causes a transistor Q3 to turn on, which causes another transistor Q4 to turn on. With the transistor Q4 placed in a conducting condition, the base-emitter junctions of transistors Q16, Q17 and Q18 are forward biased thereby causing these transistors to turn on (see FIG. 2B). Turning on transistors Q16, Q17 and Q18 respectively cause transistors Q6, Q7 and Q8 to turn on to provide the same functions provided by the correspondingly designated transistors in FIG. 1B. That is, transistor Q6 causes a "lamp flash" signal to be applied to the lamp associated with the line pair 9 and 14. The transistor Q7 causes power to be applied to a motor which operates the interrupter and the transistor Q8 causes ringing current to be applied to the key telephone set ringer or buzzer. Transistors Q3, Q4, Q16, Q17 and Q18 are provided to amplify the signal which drives transistors Q6, Q7 and Q8.

Figure 2B:
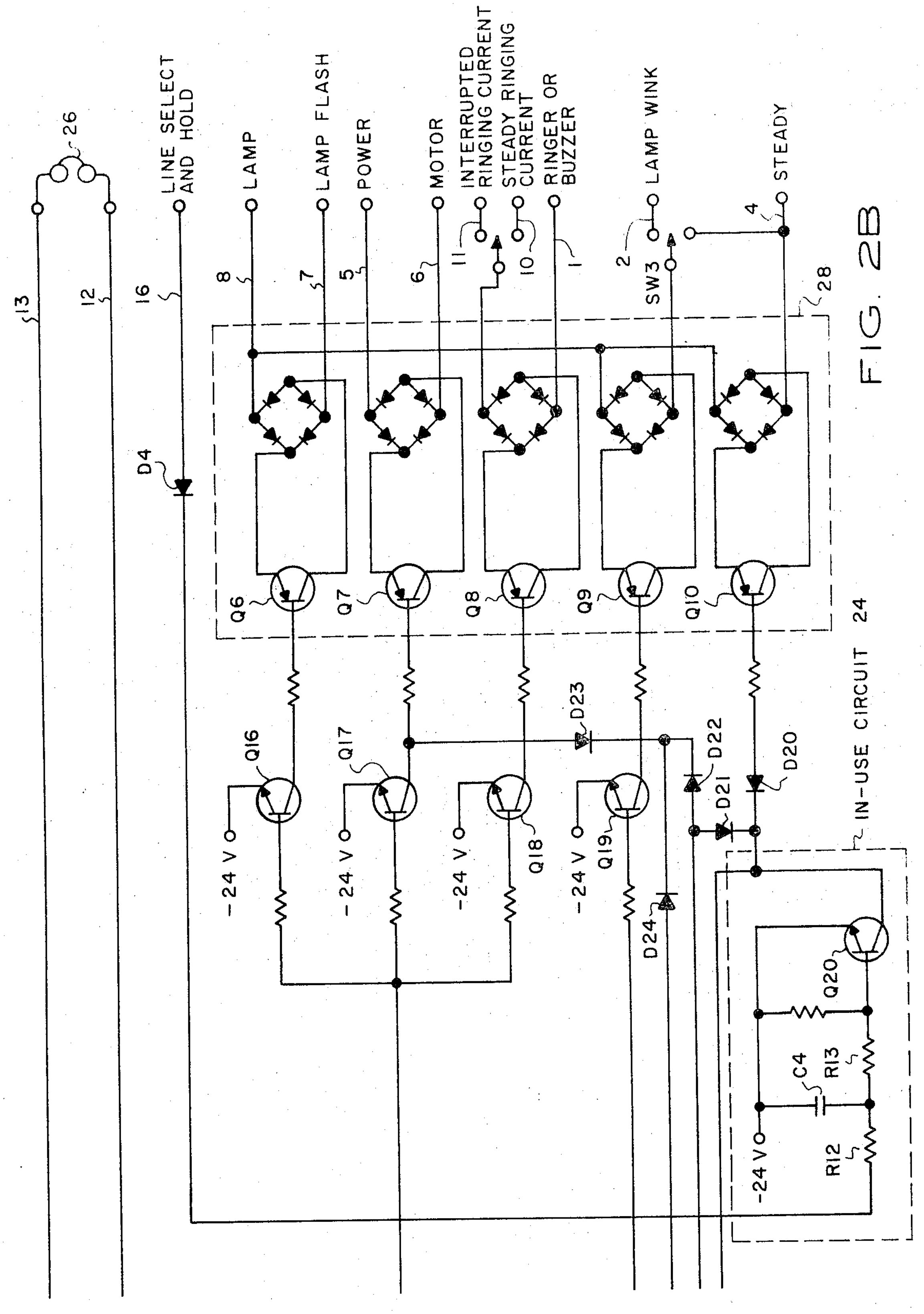

The in-use circuit 24 of FIG. 2B does not utilize the flow of line current in lead 13 to establish an "in-use" condition as did the in-use circuit of FIG. 1, but rather utilizes the application of a ground-level voltage to lead 16 in response to the telephone receiver 26 being taken off hook. That is, the ground potential applied to lead 16 is applied via a diode D4 and a resistor R12 to charge a capacitor C4. The charge on the capacitor C4, in turn, causes a transistor Q20 to turn on. With the transistor Q20 turned on, a negative voltage is applied via a diode D20 and a resistor to the base of a transistor Q10. The transistor Q10 is thereby turned on causing a "steady" signal to be applied to the lamp connected to lead 8.

The in-use circuit 24 of FIG. 2B also causes application of a negative voltage via a diode D21 to the base of a transistor Q1 thereby turning on the transistor. With the transistor Q1 turned on, an additional conductive path is provided from the bottom plate of the capacitor C3 to ground to thereby accelerate the discharging of the capacitor and thus prevent further ringing or buzzing of the key telephone set after the receiver is taken off hook.

A final function performed by the in-use circuit 24 of FIG. 2B (which is not performed by the in-use circuit of the FIG. 1 circuitry) is to provide a signal to the holding circuit 22. The function of this signal will be discussed shortly.

In the circuit of FIG. 1, a hold condition is established if two conditions obtain—these conditions being the flow of line current on the line pair 12 and 13 and the depression of the "hold" button on the set thereby removing ground potential from the lead 16. Thus, if, while the receiver is on hook (and thus ground potential is not being applied to lead 16), current is caused to flow on the line pair 12 and 13 bacause of stray line capacitance for example, the telephone set would mistakenly assume a hold condition. Although this is not likely to occur, it may be desirable to incorporate circuitry to prevent such occurrence especially in locations in the telephone network where stray line capacitance is known to be a problem. Accordingly, circuitry is provided in the holding circuit 22 of the FIG. 2 circuitry to prevent occurrence of a false hold condition.

Three conditions are required for the FIG. 2 circuitry to assume a hold condition. These conditions are (1) the flow of line current on the line pair 12 and 13, (2) the depression of the "hold" button to remove ground potential from lead 16, and (3) lead 16 having been at ground potential just prior to depression of the "hold" button indicating that the receiver of the telephone set is off hook. The addition of the third condition for the hold operation eliminates the possibility of the telephone set assuming a hold condition when the receiver is on hook and as a result of stray line capacitance. The hold operation of the circuit of FIG. 2 will now be described.

With current flowing in the line pair 12 and 13, a voltage drop is created across the diode pair D18 and D19 thereby forward biasing the light-emitting diode of an optically coupled isolator OC2. The diode of OC2 thus conducts current and thereby places OC2 in a conducting condition. With OC2 in a conducting condition, the voltage level at the base of a transistor Q22 becomes more negative causing the transistor to turn off. The collector circuit of the transistor Q22 is, in turn, placed at near ground potential and this reverse biases a diode D48. Reverse biasing the diode D48 indicates the presence of the first condition mentioned above—the flow of current in the line pair 12 and 13.

When lead 16 is at ground potential, as indicated earlier, the transistor Q20 is placed in the conducting condition and this causes the charging of a capacitor C8 via a diode D16 and a transistor Q21 to turn on. With the transistor Q21 in the "on" condition, a diode D47 is reverse biased. After ground potential is removed from lead 16 in response to the depression of the "hold" button of the telephone set, the transistor Q21 is maintained in the "on" condition for a short while because of the charge on the capacitor C8 and thus the diode D47 is maintained in a "reverse bias" condition for a short while. Maintaining the diode D47 in a "reverse bias" condition for a short while following depression of the "hold" button indicates the fulfillment of condition 3 described above.

The occurrence of condition 2 mentioned above is indicated when ground potential is removed from lead 16 causing the transistor Q20 to turn off and reverse biasing a diode D15. When the diode D15 is reversed biased, a transistor Q23, which has been in the "on" condition is turned off. (The purpose of the transistor Q23 is to maintain a transistor Q24 off when lead 16 is at ground potential.)

To recapitulate, the fulfillment of conditions 1, 2 and 3 for the circuit of FIG. 2 assuming a "hold" condition is signaled by the reverse biasing of the diode D48, the turning off of the transistor Q23 and the reverse biasing of the transistor D47 respectively. Reverse biasing the diodes D47 and D48 causes a Zener diode D49 to break down and conduct current to the base of a transistor Q25. This causes the transistor Q25 to turn on and conduct current to the base of the transistor Q24 thereby turning on that transistor.

Turning on the transistor Q24 causes the following to occur. First, the light-emitting diode of the optically coupled isolator OC1 is forward biased thus placing the isolator OC1 in a conducting condition. With OC1 in a conducting condition, current is applied to the emitter of a transistor Q11 and via a Zener diode D12 and three diodes D13 to the base of the transistor Q11. This creates an emitter-to-base voltage drop in the transistor Q11, thereby turning on the transistor. Turning on transistor Q11 results in the application of a positive voltage to the base of a transistor Q12. This places the transistor Q12 in a conducting condition thus closing a DC path between leads 12 and 13 via the transistor Q12 and a resistor R23 as required for the "hold" condition.

The second occurrence resulting from the turning on of transistor Q24 is that a near ground potential is applied to the base of a transistor Q19 thereby turning on the transistor. This causes a negative voltage to be applied via the transistor Q19 to the base of a transistor Q9 turning on that transistor. Turning on the transistor Q9, of course, causes either a "lamp wink" or a "steady" current to be applied to the lamp connected to lead 8.

Turning on the transistor Q19 also causes a negative voltage to be applied to the base of the transistor Q7 to thereby turn on the transistor and provide for applying power from lead 5 to the interrupter motor connected to lead 6. The interrupter motor, of course, enables the generation of the lamp wink signal.

Even though transistor Q21 turns off a short while after the depression of the "hold" button (i.e. after the capacitor C8 discharges following depression of the "hold" button), the transistor Q24 is maintained in the "on" condition by a negative voltage applied via a diode D24 and a resistor R9 to the base of the transistor Q24. Thus, in the manner described, a hold condition is established and maintained in response to the occurrence of three conditions.

The "hold" condition is removed either by reselection of a line at the key telephone set which causes lead 16 to be grounded or by the party at the other end of the line hanging up the telephone receiver preventing further flow of current on the line pair 12 and 13. In the first case—lead 16 being grounded—the transistor Q20 is turned on causing a negative voltage to be applied via the diode D15 to the base of the transistor Q23. The transistor Q23 is thus turned on and, in turn, causes transistor Q24 to turn off. With the transistor Q24 turned off, the transistors Q19 and Q9 are turned off thereby preventing further application of either the "lamp wink" or "steady" signal (depending on the setting of switch SW3) to the line lamp connected to lead 8. The turning off of transistor Q24 also causes the isolator OC1 to become non-conducting, thereby turning off transistors Q11 and Q12 so that the DC path across the lines 12 and 13 is removed.

The other method of removing the "hold" condition is initiated when current ceases to flow on lines 12 and 13 causing the isolator OC2 to become non-conducting. This causes the transistor Q22 to turn on which, in turn, causes the transistor Q23 to turn on and therefore the transistor Q24 to turn off. The sequence described above then follows and the "hold" condition is removed.

The capacitor C7 connected in parallel with the isolator OC2 may be provided (optional) to prevent the transistor Q22 from turning on in response to a momentary reversal of polarity on the lines 12 and 13. That is, a "hold" condition is maintained even though momentary line reversals occur.

Figure 3:
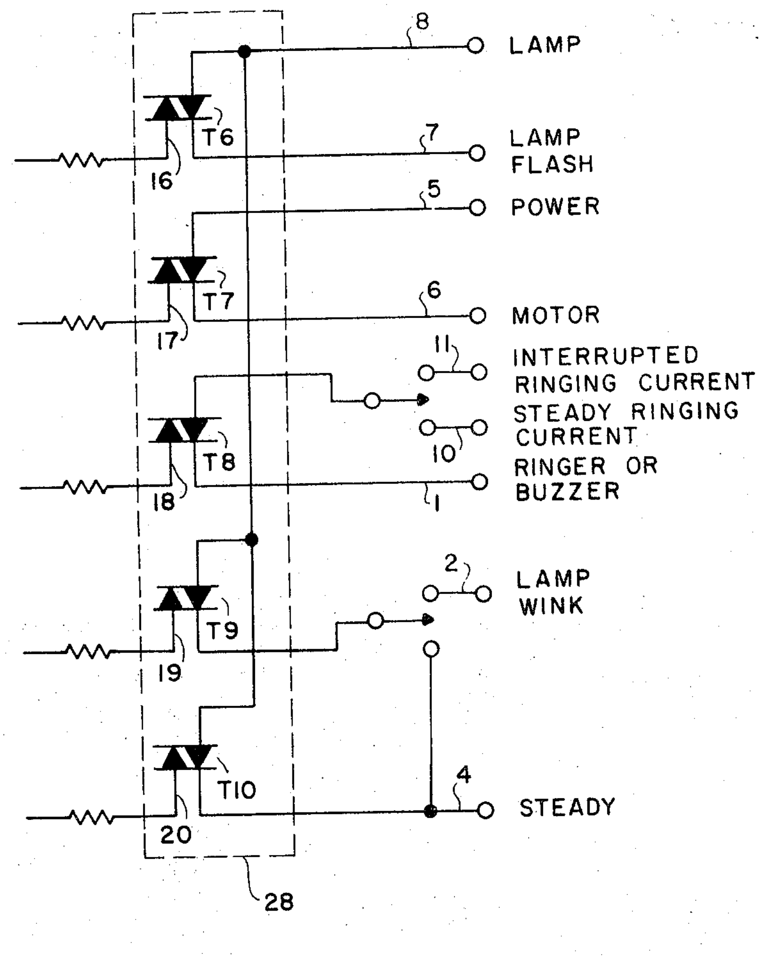
FIG. 3 shows an alternative circuit configuration for a portion of the circuitry of FIG. 2B.

FIG. 3 shows an illustrative embodiment of that portion of FIG. 2B enclosed in the dashed-line box 28. The FIG. 3 circuitry could be utilized in place of the circuitry in box 28 of FIG. 2B if the current applied to the various leads 1 through 11 were AC and not DC. The reason for this will be mentioned shortly.

The circuitry of FIG. 3 comprises a plurality of solid state bilateral triode switches T6 through T10 interconnecting various ones of the leads 1 through 11. The operation of each triode switch is controlled by the flow of current to the control electrodes 16 through 20. That is, when enabling current is applied to a control electrode of one of the triode switches, the corresponding triode switch provides a low impedance path in either direction between its power electrodes. When the enabling current is removed from a control electrode and the voltage of the AC signal applied across the power electrodes passes through the zero voltage level, the corresponding triode switch becomes nonconductive. In this manner, the bilateral triode switches provide a simple and efficient means of controlling current from various ones of the current supplies to the corresponding current sinks.

The bilateral triode switch is not suitable for use with DC current sources since, even though the current applied to the control electrode of a triode switch were removed, the switch would continue to conduct current between its power electrodes until a near zero voltage level were obtained across the power electrodes. Thus, the triode switches would continue to conduct even after removal of the control current which otherwise would prevent such conduction. Bilateral triode switches could also be used in place of certain of the transistor-diode bridge combination of FIG. 1.

It is to be understood that the above described embodiments are only illustrative of the application of the principles of the present invention. Modifications in these embodiments may be devised by those skilled in the art without departing from the spirit and scope of the invention. The following claims are intended to cover such modifications.

What is claimed is:

1. In combination in a key telephone system, a control circuit comprising a telephone line pair connected to a telephone switching office and to a key telephone set receiver, a ringing current detection circuit responsive to ringing current on said line pair for generating control signals, said ringing current detection circuit including a full-wave diode bridge rectifier connected to said line pair, a capacitor responsive to ringing current supplied from said pair via said rectifier connected to said line pair for storing a charge, an array of transistors responsive to the charge stored on said capacitor for generating first and second control signals, and an optically-coupled isolator responsive to said second control signal for generating a third control signal, and current supply control circuits responsive to said control signals for controlling the application of current from various current supplies to various loads.

2. The circuit of claim 1 wherein said current supply control circuits include a first current supply control circuit responsive to said first control signal for applying current from a current supply to the interrupter motor of said key telephone system, a second current supply control circuit responsive to said second control signal for applying lamp-flash current from a current supply to the key telephone system line lamp associated with said line pair, and a third current supply control circuit responsive to said third control signal for applying ringing or buzzing current from a current supply to the ringer or buzzer of said key telephone system.

3. In combination in a key telephone system, a control circuit comprising a telephone line pair connected to a telephone switching office and to a key telephone set receiver, a ringing current detection circuit responsive to ringing current on said line pair for generating control signals an in-use circuit which comprises an optically-coupled isolator responsive to the flow of current in one line of said line pair for generating a fourth control signal, a full-wave diode bridge rectifier coupled in said line pair for rectifying current in said one line of said line pair, and a current supply control circuit responsive to said fourth control signal for applying steady-lamp current from a current supply to said key telephone system line lamp.

4. The circuit of claim 3 wherein said ringing current detection circuit comprises a full-wave diode bridge rectifier connected to said line pair, a capacitor responsive to ringing current supplied from said pair via said rectifier connected to said line pair for storing a charge, an array of transistors responsive to the charge stored on said capacitor for generating control signals, and said control circuit further comprising a transistor whose collector and emitter are connected across said capacitor and which is responsive to said fourth control signal for enabling the flow of current from one plate of said capacitor to the other plate thereof, to thereby discharge said capacitor.

5. In combination in a key telephone system, a control circuit comprising a telephone line pair connected to a telephone switching office and to a key telephone set receiver, a holding circuit which comprises a first transistor interconnecting said line pair, an optically-coupled isolator responsive to a holding signal from said key telephone system and to the flow of current in one line of said line pair for generating a biasing signal, and a second transistor responsive to said biasing signal for assuming a conducting condition and for thereby causing said first transistor to conduct current between said line pair, thereby providing a holding path for said line pair.

6. The circuit of claim 5 further comprising a ringing current detection circuit responsive to ringing current on said line pair for generating control signals, current supply control circuitry responsive to said control signals for controlling the application of current from various current supplies to various loads, and wherein said holding circuit further comprises a second optically-coupled isolator responsive to the conduction of current by said first transistor for generating a fifth control signal and wherein said current supply control circuits include a fifth current supply control circuit responsive to said fifth control signal for applying lamp-wink current from a current supply to said key telephone system line lamp.

7. The circuit of claim 6 wherein said holding circuit further comprises means for maintaining said second transistor in a conducting condition for a certain period of time after removal of said biasing signal.

8. In combination in a key telephone system, a control circuit comprising a telephone line pair connected to a telephone switching office and to a key telephone set receiver, a pair of line and select hold terminals interconnected with a holding circuit, said holding circuit comprising means responsive to the flow of current in one line of said line pair for generating a first condition signal, means responsive to the removal of a voltage signal from the key telephone system line select and hold terminals for generating a second condition signal, means responsive to said voltage signal on said line select and hold terminals for generating a third condition signal which persists for a period of time following the removal of said voltage from said line select and hold terminal, and means responsive to the coincident generation of said first, second and third condition signals for generating a holding condition signal.

9. The circuit of claim 8 wherein said first condition signal generating means comprises an optically-coupled isolator responsive to the flow of current in one line of said line pair for generating a biasing signal and a transistor responsive to said biasing signal for assuming a conducting condition to thereby generate said first condition signal.

10. The circuit of claim 8 wherein said holding circuit further comprises a first transistor interconnecting said line pair, an optically-coupled isolator responsive to said holding condition signal for generating a biasing signal, and a second transistor responsive to said biasing signal for assuming a conducting condition and for thereby causing said first transistor to conduct current between said line pair, thereby providing a holding path for said line pair.

11. The circuit of claim 10 further including a ringing current detection circuit responsive to ringing current on said line pair for generating control signals, current supply control circuits responsive to said control signals for controlling the application of current from various current supplies to various loads, and wherein said current supply control circuits include a fifth current supply control circuit responsive to said holding condition signal for applying lamp-wink current to said key telephone system line lamp.

12. In a key telephone system including a plurality of current supplies, a plurality of current-using loads, a telephone receiver, and a telephone line pair for interconnecting said receiver to a telephone switching office, a control circuit comprising a ringing current detection circuit connected to said line pair for detecting ringing current applied to said line pair by said telephone switching office and for generating a plurality of control signals in response thereto, said detection circuit comprising a capacitor, a full-wave diode bridge rectifier connected to said line pair for charging said capacitor by applying ringing current thereto, and an array of transistors responsive to the charge on said capacitor for generating said control signals, a first transistor whose emitter and collector are connected across said capacitor, an optically-coupled isolator responsive to an off-hook signal from said receiver for applying a first control signal to the base of said first transistor, thereby causing said first transistor to conduct current from one plate of said capacitor to the other plate thereof to thereby discharge said capacitor, and a first current supply control circuit responsive to said first control signal for applying current from a certain one of said current supplies to a certain one of said loads.

13. In a key telephone system including a plurality of current supplies, a plurality of current-using loads, a telephone receiver, and a telephone line pair for interconnecting said receiver to a telephone switching office, a control circuit comprising a ringing current detection circuit connected to said line pair for detecting ringing current applied to said line pair by said telephone switching office and for generating a plurality of control signals in response thereto, said detection circuit comprising a capacitor, a full-wave diode bridge rectifier connected to said line pair for charging said capacitor by applying ringing current thereto, and an array of transistors responsive to the charge on said capacitor for generating said control signals, a first transistor whose emitter and collector are connected across said capacitor, a second transistor interconnecting a voltage source to the base of said first transistor and responsive to a voltage signal generated on the key telephone system's line select and hold terminal in response to said receiver being taken off-hook for assuming a conducting condition thereby causing application of voltage from said voltage source to the base of said first transistor, causing said first transistor to conduct current from one plate of said capacitor to the other plate thereof to thereby discharge said capacitor, and a first current supply control circuit responsive to voltage received from said voltage source via said second transistor for applying current from a certain one of said current supplies to a certain one of said loads.

14. The circuit of claim 12 further comprising a second transistor connected to a first line of said line pair, a second optically-coupled isolator including a light-emitting diode, one side of said diode being connected to said second transistor and the other side of said diode being connected to the second line of said line pair, and means responsive to a holding signal from said key telephone unit for turning on said second transistor, thereby allowing current to flow from the second line of said pair through the diode of said second optically-coupled isolator and through said second transistor to the first line of said pair to thereby place said line pair on hold.

15. The circuit of claim 14 wherein said second optically-coupled isolator is responsive to the flow of current through its diode for generating a second control signal and wherein the circuit comprises a second current supply circuit responsive to said second control signal for applying current from a certain one of said current supplies to a certain one of said loads.

* * * * *